Figure 1:
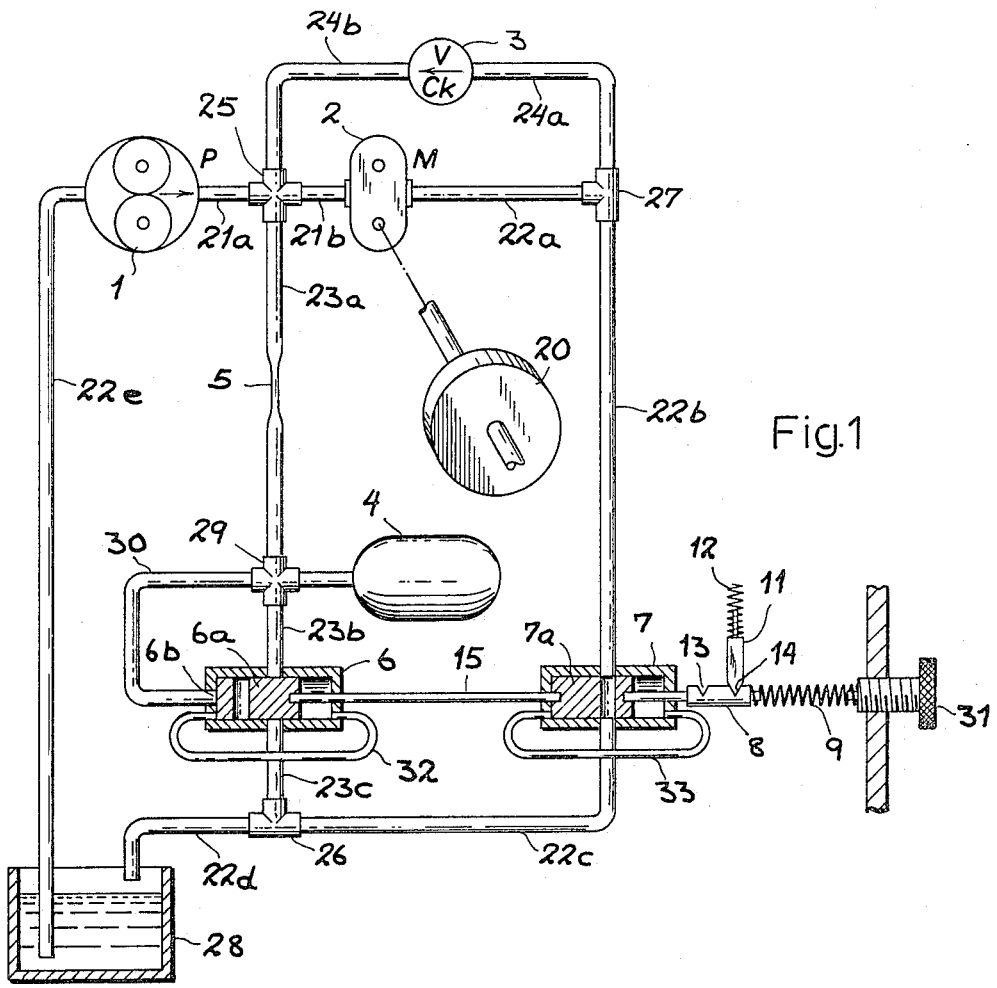

INVENTOR:
Hans-Christof Klein

3,274,779
FLOW REGULATOR FOR FLUID SYSTEMS
Hans-Christof Klein, Hattersheim, Germany, assignor to Alfred Teves Kommanditgesellschaft, Frankfurt am Main, Germany, a corporation of Germany
Filed Dec. 17, 1964, Ser. No. 419,030
Claims priority, application Germany, Dec. 18, 1963, T 25,285
8 Claims. (Cl. 60—53)

This invention relates to a flow regulator for a hydraulic or other fluid system of the general type described in my copending application Ser. No. 326,270, filed November 26, 1963.

The flow regulator referred to is designed to distribute a steady stream of fluid, delivered at high pressure by a pump or other source, between two branch lines of which one leads to a useful load while the other is returned to the source, the division being carried out by a rapidly oscillating valve which periodically switches the supply line from one branch to the other and vice versa.

The oscillating valve disclosed in my copending application requires for its actuation an external force, e.g. that of an electromagnetic system with periodically interrupted energization; only in one embodiment, using a rotary rather than a slidable valve body, this external force is dispensed with and is replaced by a driving force derived from the circulating fluid itself.

The general object of my present invention is to provide a regulator of this character in which an oscillatory valve body is periodically displaced without the use of an external force.

A more particular object of this invention is to provide means in conjunction with such flow regulator for enabling continuous operation of a hydraulic motor, serving to drive a high-inertia load, during periods in which normal circulation of pumped fluid through the motor is interrupted by the oscillating valve.

Let us define, for convenience, the fluid line extending from the discharge port of the source to the high-pressure side of the driven unit (e.g. a hydraulic motor) as a first conduit and the line extending from the outlet side of the unit to the intake port of the source as a second conduit, this latter conduit being either continuous or interrupted by a sump or reservoir to which excess fluid is returned before being recirculated through the system. In accordance with a feature of my invention, I provide a third conduit extending from the first to the second conduit to form a bypass, this third conduit having a constriction to throttle the fluid flow therethrough at a location ahead of a first two-way valve inserted in this third conduit ahead of its junction with the second conduit. A second two-way valve, ganged with the first valve for joint oscillation, is inserted in the second conduit between this junction and the outlet side of the driven unit or motor; a preferably adjustable biasing element, such as a spring, urges the two valves into a first position in which the first valve is closed and the second valve is open to permit normal circulation through the first and second conduits for displacement of the driven unit by the fluid pump, this biasing force being counteracted by fluid pressure derived from an accumulator which is connected to the third conduit at a location between its throttling point and the first valve. Thus, the accumulator charges progressively through the constriction until its pressure has risen to a value sufficient to displace the ganged valves against their biasing force into a second position in which the third conduit is open and the second conduit is blocked, the accumulator then discharging rapidly through the open first valve until the biasing force can restore the first valve position. Advantageously, according to a more specific feature of my invention, means are provided for releas-ably indexing the two valves in either of their aforementioned positions so that the resistance thereof must be overcome before the valve position is reversed, a definite pressure differential being thus required to shift the valves.

If the driven unit is represented by a continuously operable hydraulic motor coupled with a load of high inertia, the motor will act as a pump against the arrested fluid flow so that means should be provided for permitting circulation of the motor-propelled fluid over an alternate path. In such case, according to a further feature of my invention, I therefore provide a fourth conduit which bridges the motor and includes a check valve to permit only unidirectional passage of fluid therethrough.

Figure 2:
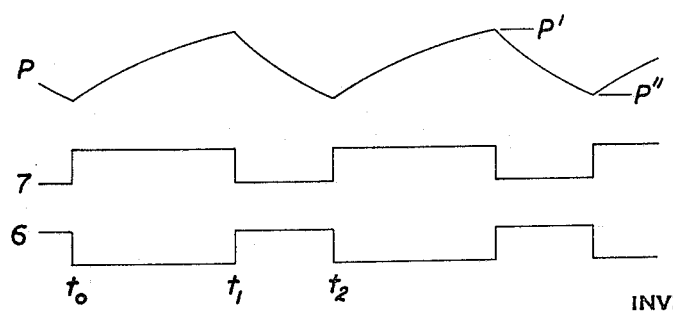

The invention will be described in greater detail hereinafter with reference to the accompanying drawing in which:

FIG. 1 is a diagrammatic view of a hydraulic system including a flow regulator according to the invention; and FIG. 2 is a set of graphs relating to the system of FIG. 1.

The hydraulic system shown in FIG. 1 comprises a pump 1 and a hydraulic motor 2 mechanically coupled with a load 20 of high inertia, shown diagrammatically as a flywheel; a first conduit 21a, 21b leads from the discharge port of pump 1 to the inlet side of motor 2 whose outlet side is connected with the intake port of pump 1 via a second conduit composed of sections 22a, 22b, 22c, 22d and 22e. Conduit sections 21a and 21b are separated by a four-way junction 25 from which a third conduit, composed of sections 23a, 23b and 23c, extends to a three-way junction 26 interposed between conduit sections 22c and 22d. A fourth conduit 24a, 24b leads from junction 25 to another three-way junction between conduit sections 22a and 22b, thus bypassing the motor 2; a check valve 3 is inserted between sections 24a and 24b to permit fluid flow only in a direction from junction 27 to junction 25. The second conduit is interrupted between sections 22d and 22e by a fluid reservoir 28. Conduit section 23a is provided with a constriction 5 and is separated from section 23b by another four-way junction 29 to which are also connected a pressure accumulator 4 and a branch line 30. Accumulator 4 may be of any conventional type including, for example, an inflatable bladder, a spring-loaded piston or a membrane confining a compressible gas.

A first two-way valve 6 is disposed between conduit sections 23b and 23c and comprises a slidable valve body 6a displaceable under fluid pressure from branch line 30 which enters the valve housing at a port 6b; valve body 6a is ganged via a link 15 with a similar valve body 7a of a second two-way valve 7 lying between conduit sections 22b and 22c. A rod 8, projecting from the housing of valve 7 and rigid with the movable valve body 7a thereof, is under axial pressure from a compression spring 9 which opposes the rightward displacement of valve bodies 6a and 7a by the fluid in line 30 and which tends to maintain these valve bodies in the illustrated position in which body 6a blocks the conduit 23a–23c whereas body 7a opens the connection between conduit sections 22b and 22c to permit the passage of fluid from pump 1 to motor 2 and back to reservoir 28; spring 9 bears upon a stud 31 which is threadedly adjustable to vary the spring pressure. Rod 8 is formed with a pair of notches 13, 14 which are respectively engageable in the two limiting valve positions by an index pin 11 yieldably maintained in the engaged notch by a spring 12.

The system of FIG. 1 operates as follows:

With the pump 1 continuously driven by a source of power not shown, motor 2 is operated by the circulating fluid as long as the valves 6 and 7 are in their illustrated first position (pin 11 in engagement with notch 14). Fluid from pump 1 also flows at a reduced rate through the constriction 5 into the acculator 4 to increase the pressure acting upon valve body 6a via line 30. When this pressure has reached a value sufficient to overcome the stress of spring 9 as well as the resistance of index pin 11, this pin is cammed out of its notch 14 and the valve bodies 6a and 7a are shifted to the right into their alternate position in which pin 11 drops into notch 13. Now the bypass between junctions 25 and 26 is unblocked and pump 1 delivers its fluid directly to reservoir 28 without driving the motor 2 which, however, is still entrained by the inertia of its load 20 and which therefore acts as as impeller for the fluid in conduit sections 21b, 21a; this fluid, which cannot flow out via conduit section 22b in view of the blocking effect of valve body 7a, is now recirculated through the return path created by conduit sections 24a, 24b and check valve 3. Meanwhile, accumulator 4 discharges rapidly through valve body 6a and the pressure in line 30 drops to a level sufficient to let the spring 9 restore the system to its original position with the camming pin 11 out of notch 13 and subsequent reentry thereof into notch 14; the shifting of the valve bodies occurs virtually instantaneously.

FIG. 2 illustrates the variation in the pressure P of accumulator 4 (and therefore of line 30) in its upper graph; the opening and closing of valves 6 and 7 has been illustrated in the lower and middle graphs, respectively. It has been assumed in this case that the charging of the accumulator to its upper pressure level P' occurs at a somewhat slower rate than its discharge to the lower level P'', these two rates being of course determined inter alia by the effective cross-section of throttle 5 and the bore of valve body 6a. Furthermore, adjustment of the pressure of spring 9 by means of stud 31 will alter the magnitudes of P' and P'' so that, in view of the nonlinear charging and discharging rates, the relative lengths of the charging interval $t_0 - t_1$ (valve 7 open) and the discharging interval $t_1 - t_2$ (valve 6 open) will be varied. The total cycle length $t_0 - t_2$ should be, in any event, short enough to permit a virtually steady rotation of motor 2 and load 20. Conduits 32, 33 interconnect opposite sides of valve pistons 6a and 7a, respectively, to facilitate the displacement of hydraulic fluid by these pistons. The conduits 32 and 33 could, if desired, include respective flow amplifiers to accelerate the shifting of the valve bodies in the manner disclosed in my aforementioned copending application Ser. No. 326,270.

Modifications of the specific system described and illustrated are, of course, possible without departing from the spirit and scope of my invention as defined in the appended claims.

I claim:

1. In a propulsion system for the displacement of a driven unit by a source of fluid under pressure, said system including first conduit means extending from a discharge port of said source to an inlet side of said unit and second conduit means extending from an outlet side of said unit to an intake port of said source, the combination therewith of third conduit means connecting said first conduit means with said second conduit means; throttle meas in said third conduit means; first valve means in said third conduit means between said throttle means and said second conduit means; second valve means in said second conduit means between said outlet side of said unit and a junction of said second and third conduit means, said second valve means being ganged with said first valve means for joint oscillation between a first position and a second position, said second conduit means being unblocked by said second valve means in said first position only for operation of said unit by fluid from said source, said third conduit means being unblocked by said first valve means in said second position only for bypassing fluid from said discharge port to said intake port; accumulator means for fluid under pressure connected to said third conduit means at a location between said throttle means and said first valve means; biasing means coupled with said first and second valve means for tending to maintain same in said first position; and actuating means responsive to fluid pressure at said location for urging said first and second valve means into said second position against the force of said biasing means upon said pressure reaching a predetermined maximum whereby said second valve means blocks said second conduit means ahead of said junction and said accumulator means discharges through said junction until the pressure at said location drops to a predetermined minimum allowing said biasing means to restore said first and second valve means to said first position.

2. In a propulsion system for the displacement of a driven unit by a hydraulic pump, said system including first conduit means extending from a discharge port of said pump to an inlet side of said unit and second conduit means extending from an outlet side of said unit to an intake port of said pump, the combination therewith of third conduit means connecting said first conduit means with said second conduit means; throttle means in said third conduit means; first two-way valve means in said third conduit means between said throttle means and said second conduit means; second two-way valve means in said second conduit means between said outlet side of said unit and a junction of said second and third conduit means, said second valve means being ganged with said first valve means for joint oscillation between a first position and a second position, said second conduit means being unblocked by said second valve means in said first position only for operation of said unit by hydraulic fluid from said pump, said third conduit means being unblocked by said first valve means in said second position only for bypassing fluid from said discharge port to said intake port; accumulator means for hydraulic fluid under pressure connected to said third conduit means at a location between said throttle means and said first valve means; biasing means coupled with said first and second valve means for tending to maintain same in said first position; and hydraulic actuating means responsive to fluid pressure at said location for urging said first and second valve means into said second position against the force of said biasing means upon said pressure reaching a predetermined maximum whereby said second valve means blocks said second conduit means ahead of said junction and said accumulator means discharges through said junction until the pressure at said location drops to a predetermined minimum allowing said biasing means to restore said first and second valve means to said first position.

3. In a propulsion system for the displacement of a driven unit by a source of fluid under pressure, said system including first conduit means extending from a discharge port of said source to an inlet side of said unit and second conduit means extending from an outlet side of said unit to an intake port of said source, the combination therewith of third conduit means connecting said first conduit means with said second conduit means; throttle means in said third conduit means; first valve means in said third conduit means between said throttle means and said second conduit means; second valve means in said second conduit means between said outlet side of said unit and a junction of said second and third conduit means, said second valve means being ganged with said first valve means for joint oscillation between a first position and a second position, said second conduit means being unblocked by said second valve means in said first position only for operation of said motor by fluid from said source, said third conduit means being unblocked by said first valve means in said second position only for bypassing fluid from said discharge port to said intake port; accumulator means for fluid under pressure connected to said third conduit means at a location between said throttle means and said first valve means; indexing means for releasably retaining said first and second valve means in either of said positions; biasing means coupled with said first and second valve means for tending to maintain same in said first position; and actuating means responsive to fluid pressure at said location for urging said first and second valve means into said second position against the force of said biasing means and the resistance of said indexing means upon said pressure reaching a predetermined maximum whereby said second valve means blocks said second conduit means ahead of said junction and said accumulator means discharges through said junction until the pressure at said location drops to a predetermined minimum allowing said biasing means to restore said first and second valve means to said first position against the resistance of said indexing means.

4. In a propulsion system for the displacement of a driven unit by a hydraulic pump, said system including first conduit means extending from a discharge port of said pump to an inlet side of said unit and second conduit means extending from an outlet side of said unit to an intake port of said pump, the combination therewith of third conduit means connecting said first conduit means with said second conduit means; throttle means in said third conduit means; first two way valve means in said third conduit means between said throttle means and said second conduit means; second two-way valve means in said second conduit means between said outlet side of said unit and a junction of said second and third conduit means, said second valve means being ganged with said first valve means for joint oscillation between a first position and a second position, said second conduit means being unblocked by said second valve means in said first position only for operation of said unit by hydraulic fluid from said pump, said third conduit means being unblocked by said first valve means in said second position only for bypassing fluid from said discharge port to said intake port; accumulator means for hydraulic fluid under pressure connected to said third conduit means at a location between said throttle means and said first valve means; indexing means for releasably retaining said first and second valve means in either of said positions; biasing means coupled with said first and second valve means for tending to maintain same in said first position; and hydraulic actuating means responsive to fluid pressure at said location for urging said first and second valve means into said second position against the force of said biasing means and the resistance of said indexing means upon said pressure reaching a predetermined maximum whereby said second valve means blocks said second conduit means ahead of said junction and said accumulator means discharges through said junction until the pressure at said location drops to a predetermined minimum allowing said biasing means to restore said first and second valve means to said first position against the resistance of said indexing means.

5. In a propulsion system for the continuous displacement of a high-inertia load by a motor driven by a source of fluid under pressure, said system including first conduit means extending from a discharge port of said source to an inlet side of said motor and second conduit means extending from an outlet side of said motor to an intake port of said source, the combination therewith of third conduit means connecting said first conduit means with said second conduit means; throttle means in said third conduit means; first valve means in said third conduit means between said throttle means and said second conduit means; second valve means in said second conduit means between said outlet side of said motor and a junction of said second and third conduit means, said second valve means being ganged with said first valve means for joint oscillation between a first position and a second position, said second conduit means being unblocked by said second valve means in said first position only for operation of said motor by fluid from said source, said third conduit means being unblocked by said first valve means in said second position only for bypassing fluid from said discharge port to said intake port; accumulator means for fluid under pressure connected to said third conduit means at a location between said throttle means and said first valve means; biasing means coupled with said first and second valve means for tending to maintain same in said first position; actuating means responsive to fluid pressure at said location for urging said first and second valve means into said second position against the force of said biasing means upon said pressure reaching a predetermined maximum whereby said second valve means blocks said second conduit means ahead of said junction and said accumulator means discharges through said junction until the pressure at said location drops to a predetermined minimum allowing said biasing means to restore said first and second valve means to said first position; fourth conduit means forming a return path for fluid from said outlet side of said motor to said inlet side of said motor; and check-valve means in said return path permitting unidirectional flow of fluid over said return path upon a blocking of said second conduit means by said second valve means with continuing operation of said motor by the inertia of said load.

6. In a propulsion system for the continuous displacement of a high-inertia load by a hydraulic motor driven by a hydraulic pump, said system including first conduit means extending from a discharge port of said pump to an inlet side of said motor and second conduit means extending from an outlet side of said motor to an intake port of said pump, the combination therewith of third conduit means connecting said first conduit means with said second conduit means; throttle means in said third conduit means; first two-way valve means in said third conduit means between said throttle means and said second conduit means; second two-way valve means in said second conduit means between said outlet side of said motor and a junction of said second and third conduit means, said second valve means being ganged with said first valve means for joint oscillation between a first position and a second position, said second conduit means being unblocked by said second valve means in said first position only for operation of said motor by hydraulic fluid from said pump, said third conduit means being unblocked by said first valve means in said second position only for bypassing fluid from said discharge port to said intake port; accumulator means for hydraulic fluid under pressure connected to said third conduit means at a location between said throttle means and said first valve means; biasing means coupled with said first and second valve means for tending to maintain same in said first position; hydraulic actuating means responsive to fluid pressure at said location for urging said first and second valve means into said second position against the force of said biasing means upon said pressure reaching a predetermined maximum whereby said second valve means blocks said second conduit means ahead of said junction and said accumulator means discharges through said junction until the pressure at said location drops to a predetermined minimum allowing said biasing means to restore said first and second valve means to said first position; fourth conduit means forming a return path for fluid from said outlet side of said motor to said inlet side of said motor; and check-valve means in said return path permitting unidirectional flow of fluid over said return path upon a blocking of said second conduit means by said second valve means with continuing operation of said motor by the inertia of said load.

7. In a propulsion system for the continuous displacement of a high-inertia load by a motor driven by a source of fluid under pressure, said system including first conduit means extending from a discharge port of said source to an inlet side of said motor and second conduit means extending from an outlet side of said motor to an intake port of said source, the combination therewith of third conduit means connecting said first conduit means with said second conduit means; throttle means in said third conduit means; first valve means in said third conduit means between said throttle means and said second conduit means; second valve means in said second conduit means between said outlet side of said motor and a junction of said second and third conduit means, said second valve means being ganged with said first valve means for joint oscillation between a first position and a second position, said second conduit means being unblocked by said second valve means in said first position only for operation of said motor by fluid from said source, said third conduit means being unblocked by said first valve means in said second position only for bypassing fluid from said discharge port to said intake port; accumulator means for fluid under pressure connected to said third conduit means at a location between said throttle means and said first valve means; indexing means for releasably retaining said first and second valve means in either of said positions; biasing means coupled with said first and second valve means for tending to maintain same in said first position; actuating means responsive to fluid pressure at said location for urging said first and second valve means into said second position against the force of said biasing means and the resistance of said indexing means upon said pressure reaching a predetermined maximum whereby said second valve means blocks said second conduit means ahead of said junction and said accumulator means discharges through said junction until the pressure at said location drops to a predetermined minimum allowing said biasing means to restore said first and second valve means to said first position against the resistance of said indexing means; fourth conduit means forming a return path for fluid from said outlet side of said motor to said inlet side of said motor; and check-valve means in said return path permitting unidirectional flow of fluid over said return path upon a blocking of said second conduit means by said second valve means with continuing operation of said motor by the inertia of said load.

8. In a propulsion system for the continuous displacement of a high-inertia load by a hydraulic motor driven by a hydraulic pump, said system including first conduit means extending from a discharge port of said pump to an inlet side of said motor and second conduit means extending from an outlet side of said motor to an intake port of said pump, the combination therewith of third conduit means connecting said first conduit means with said second conduit means; throttle means in said third conduit means; first two-way valve means in said third conduit means between said throttle means and said second conduit means, second two-way valve means in said second conduit means between said outlet side of said motor and a junction of said second and third conduit means, said second valve means being ganged with said first valve means for joint-oscillation between first position and a second position, said second conduit means being unblocked by said second valve means in said first position only for operation of said motor by hydraulic fluid from said pump, said third conduit means being unblocked by said first valve means in said second position only for bypassing fluid from said discharge port to said intake port; accumulator means for hydraulic fluid under pressure connected to said third conduit means at a location between said throttle means and said first valve means; indexing means for releasably retaining said first and second valve means in either of said positions; biasing means coupled with said first and second valve means for tending to maintain same in said first position; hydraulic actuating means responsive to fluid pressure at said location for urging said first and second valve means into said second position against the force of said biasing means and the resistance of said indexing means upon said pressure reaching a predetermined maximum whereby said second valve means blocks said second conduit means ahead of said junction and said accumulator means discharges through said junction until the pressure at said location drops to a predetermined minimum allowing said biasing means to restore said first and second valve means to said first position against the resistance of said indexing means; fourth conduit means forming a return path for fluid from said outlet side of said motor to said inlet side of said motor; and check-valve means in said return path permitting unidirectional flow of fluid over said return path upon a blocking of said second conduit means by said second valve means with continuing operation of said motor by the inertia of said load.

No references cited.

EDGAR W. GEOGHEGAN, *Primary Examiner.*